United States Patent [19]

Speer

[11] 3,752,250

[45] Aug. 14, 1973

[54] MOTOR VEHICLE AUTOMATIC IMPACT BRAKING SYSTEM

[76] Inventor: Eugene Speer, 401 Jennie Jewel Dr., Orlando, Fla. 32806

[22] Filed: Nov. 17, 1971

[21] Appl. No.: 199,419

[52] U.S. Cl. ........................ 180/92, 293/8, 293/65, 293/88
[51] Int. Cl. .............................................. B60t 7/12
[58] Field of Search ..................... 180/92, 94; 293/5, 293/6, 7, 8, 65, 71 R, 88

[56] References Cited
UNITED STATES PATENTS
1,504,505   8/1924   Reed.................................. 180/92
2,588,815   3/1952   Fasolino............................. 180/92
FOREIGN PATENTS OR APPLICATIONS
314,894   2/1934   Italy..................................... 180/92

*Primary Examiner*—Gerald M. Forlenza
*Assistant Examiner*—George F. Abraham
*Attorney*—Charles W. Helzer

[57] ABSTRACT

The system automatically actuates the standard otherwise operator controlled wheel brakes of a motor vehicle upon impact to either longitudinal end of the vehicle. The impact may be delivered directly to projections, two for each bumper, that extend freely through the vehicle bumper for a considerable distance beyond the confines of the bumper so that with a head-on collision the brakes will be actuated before there is contact with the bumper, or with a collision from the side the bumpers, which are elastically connected to the vehicle frame, will elastically deform a substantial extent in the longitudinal and transverse direction before a longitudinal lost motion connection between the bumper and projections drivingly connects the two for actuating the brakes upon further longitudinal movement of the bumper and projection as a unit. In either event, longitudinal inward movement of the projection, through the intermediary of a coil spring, will contract an expansible chamber, one associated with each projection, to pressurize fluid within a line leading to a balancing chamber having a fluid output connected to each of the wheel brakes. The wheel brakes are provided with conventional hydraulic wheel cylinders to be pressurized selectively by the vehicle operator and auxiliary hydraulic wheel cylinders to be pressurized as mentioned above automatically in response to impact through inward longitudinal driving of the projections.

8 Claims, 7 Drawing Figures

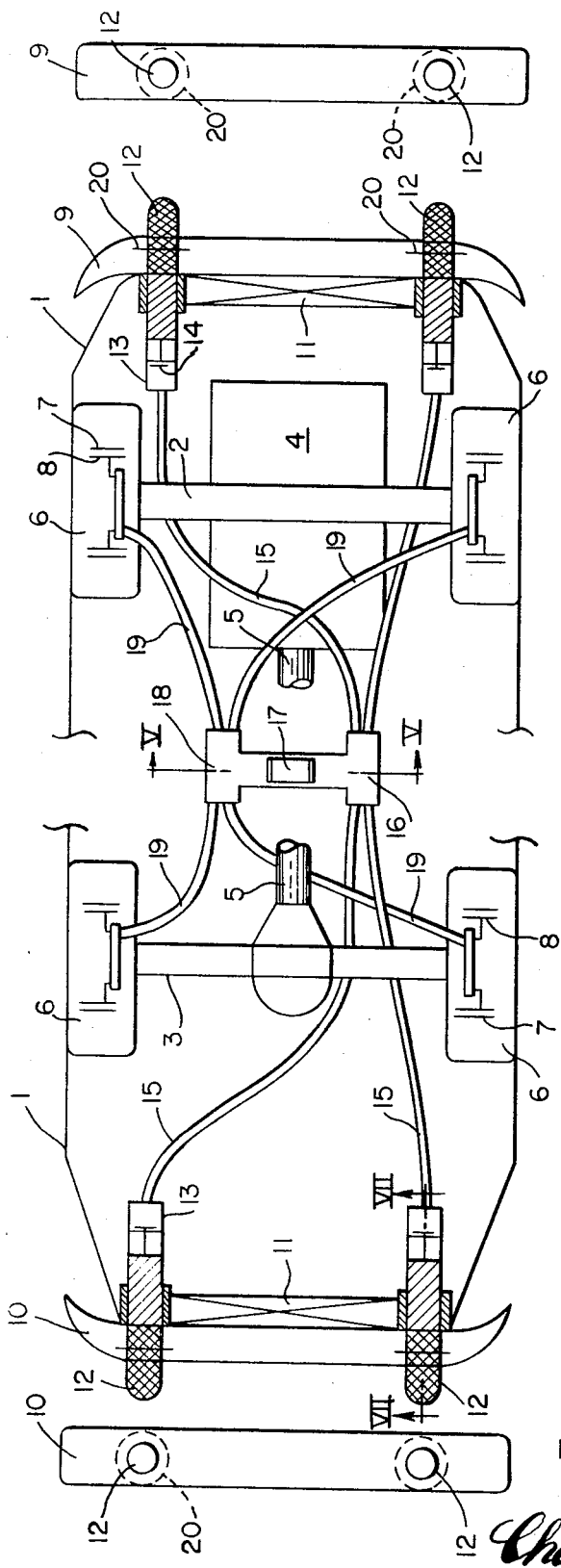

INVENTOR
EUGENE SPEER

Charles W. Helzer
ATTORNEY

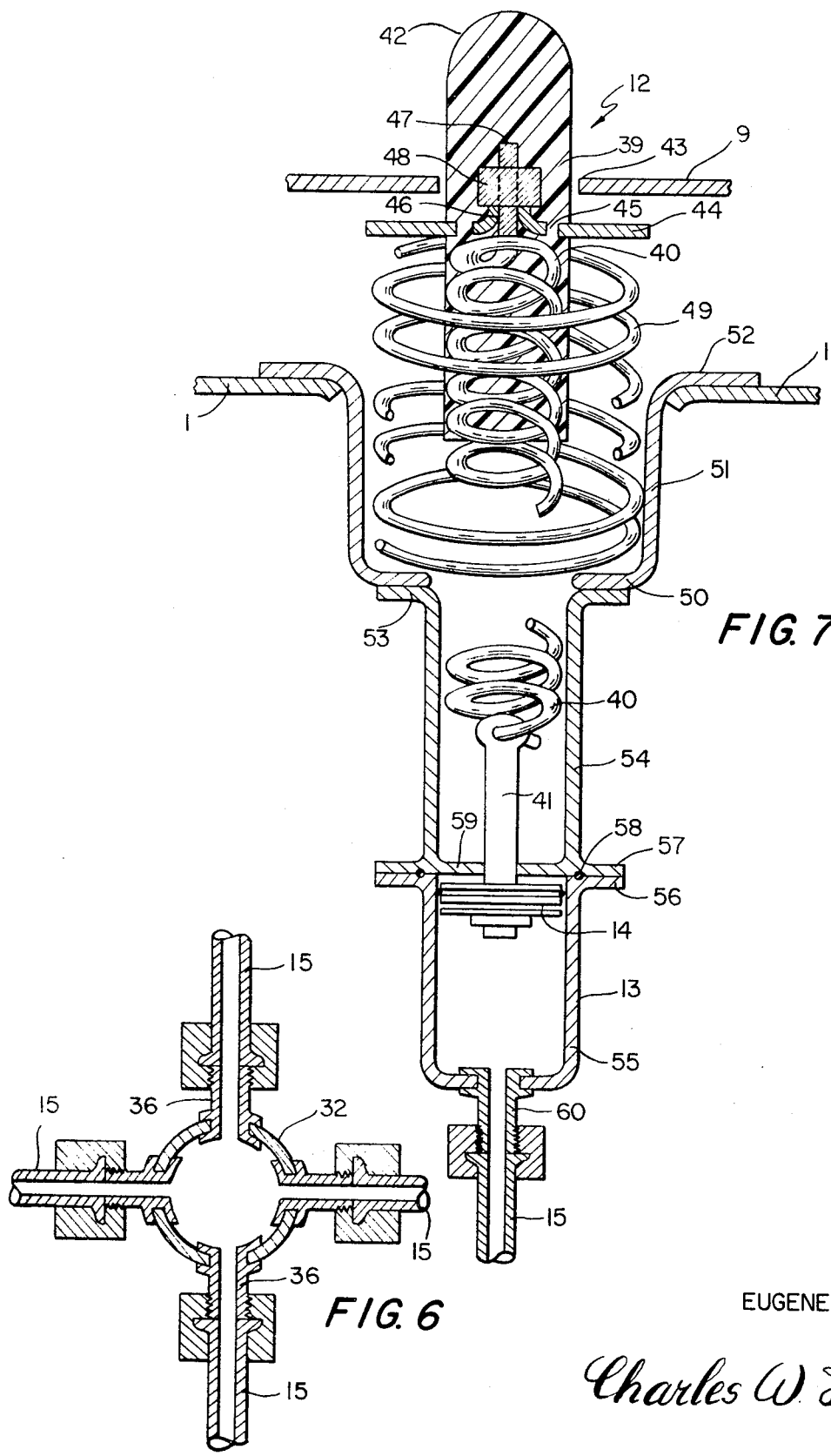

MOTOR VEHICLE AUTOMATIC IMPACT BRAKING SYSTEM

BACKGROUND OF THE INVENTION

This application is related to the invention of my concurrently filed application "Automotive Vehicle Impact Energy Reducing Bumper," the disclosure of which is incorporated herein in its entirety.

Various vehicle braking systems have employed bumpers mounted for movement with respect to the vehicle frame to pressurize the vehicle brake system, as exemplified by the patents to Kuttler, U.S. Pat. No. 3,023,829, issued Mar. 6, 1962, and Perillard, U.S. Pat. No. 2,068,279, issued Jan. 19, 1937. Additionally, various ground engaging devices have been employed, for actuation upon impact, for example as shown in the Landman et al. U.S. Pat. No. 2,843,224, issued July 15, 1958, which employs a projection that is attached to a vehicle bumper for actuating a ground engaging brake upon impact.

In general, the prior art devices, as exemplified by the above patents, are unsatisfactory when considered with respect to modern vehicles and modern vehicular traffic. Ground engaging brakes are quite impractical and could indeed be quite dangerous as well as inconvenient with respect to minor parking lot collisions, and if strong enough to resist parking lot collisions, they would be insufficiently sensitive to be of great value when needed. The devices wherein the entire bumper moves inwardly for actuating the brakes lack sensitivity in that the inertia of the bumper is quite substantial with heavy bumpers and with low inertia the bumper would be correspondingly too weak to serve its purpose.

SUMMARY OF THE INVENTION

The present invention provides a braking system that will automatically actuate the conventional vehicle brakes upon various types of impact. Projections are employed that extend beyond the confines of a relatively substantial vehicle bumper, with movement of the projection relative to the frame actuating the braking system. The projections are mounted for movement with respect to the bumper for low inertia to be quite sensitive and to actuate the brakes prior to engagement of the vehicle bumper with the impact object, which is of considerable advantage with respect to high energy impacts in that the braking system is rendered automatically operative prior to the main collision when the bumper strikes the impact object.

Further, a lost motion connection is provided in the longitudinal direction between the projections and their bumpers so that when the bumper is struck from the side it may elastically deform by means of its elastic mounting to the frame a substantial amount prior to driving the projections inwardly and actuating the braking system. Thus with minor parking impacts and the like where the bumper is struck from the side, the brakes will not be actuated and the bumper will elastically deform without permanent damage, but with major impacts from the side, the braking system will be automatically engaged. These advantages are obtained in combination with the advance braking advantages mentioned above with respect to a head-on collision, which would have the highest impact energy on the average.

The projections are advantageously molded on the outer end of coil compression springs that drive a piston of an expansible chamber, with the coil spring being guidingly received within a spring cylinder and, for extra support, being telescopically received within a larger diameter spring guided within a correspondingly larger diameter spring cylinder that extends drivingly between the projection and the vehicle frame. Further, the lost motion connection between the projection and bumper is provided by an annular abutment ring extending from the molded portion inwardly of and of a larger diameter than the hole in the bumper through which the projection extends.

The various expansible chambers drivingly connected to the projections are fluidly connected to a common subchamber that will drive a balancing piston to correspondingly pressurize an opposite subchamber having fluid lines communicating with the various wheel brake mechanisms. Preferably, each of the wheel brakes is provided with a conventional hydraulic wheel cylinder to be pressurized by a master cylinder actuated by the vehicle operator and with a second hydraulic wheel cylinder to be pressurized as mentioned above by the lines leading from the second subchamber.

BRIEF DESCRIPTION OF THE DRAWING

Further objections, features and advantages of the present invention will become more clear in the following detailed description of the drawing, wherein:

FIG. 1 is a bottom plan view of a motor vehicle employing the features of the present invention;

FIG. 2 is a rear end view of the bumper and projections of FIG. 1;

FIG. 3 is a front end view of the front bumper and projections of FIG. 1;

FIG. 6 is a cross-sectional view showing the hydraulic line couplings with the balancing cylinder taken along line VI—VI; and FIG. 7 is a cross-sectional view taken along line VII—VII of FIG. 1 showing more details of the projections and their associated expansible chambers.

DETAILED DESCRIPTION OF THE DRAWING

Figure 5:
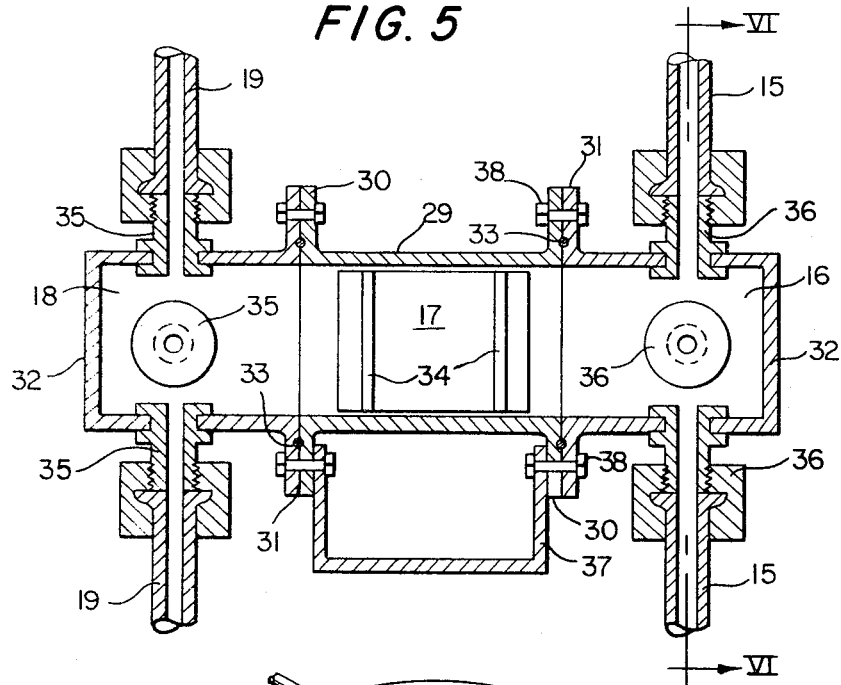
FIG. 5 is a cross-sectional view of the balancing cylinder taken along line V—V of FIG. 1.

A preferred embodiment of the present invention is shown in FIG. 1 with respect to the underside of an otherwise conventional automotive vehicle having a shematically shown frame 1 mounting by suitable suspension means a forward axle 2 and rearward axle 3, and carrying an engine 4 operatively connected to the rear axle 3 by means of a drive shaft 5. In a conventional manner, the axles 2 and 3 each carry rotatably mounted wheels 6 at their outer ends, with wheel drums 7 and hydraulically actuated brake shoes 8 being provided on all four wheels for braking the automobile. Preferably, the brake shoes 8 are actuated into braking engagement with the wheel drums 7 by means of a hydraulic system (not shown) to be selectively actuated by the vehicle operator. As shown, the vehicle is substantially symmetrical with respect to a longitudinal axis extending perpendicular to the axles 2, 3.

The forward and rearward bumpers 9, 10, respectively, may be constructed of steel, suitable tough plastics, combinations thereof, or the like. Each bumper 9, 10 is attached to the vehicle frame by a resilient mounting 11 that will allow relative rearward and transverse substantial movement between the respective bumper and frame within an elastic range without producing any permanent deformation or damage. This resilient mounting 11 has not been shown in detail since it may take on various forms, for example rubber mountings, lever linkages with shock absorbers, and coil or leaf springs, for example. The important feature about the mounting is that it will permit the bumper to move relative to the frame under light impacts within an elastic range without permanent damage.

For automatically actuating the vehicle brakes upon impact, each of the bumpers is provided with one or more, two being shown, projections 12. Since each of the projections 12 is of identical construction, only one will be described in detail. While the projections may extend above or below the respective bumpers, it is preferable to have the projections 12 extending through suitable formed longitudinally extending holes in the respective bumpers. Preferably, the projection 12 is cylindrical in cross-section and extends through a cylindrical slightly larger hole in the adjacent bumper while providing for relative longitudinal movement between the bumper and projection. Inwardly of the projection, there is provided an expansible chamber 13 having therein a piston 14 movable to pressurize fluid contained within the chamber 13. The piston 14 is drivingly connected to the projection 12 so that when the projection 12 is moved inwardly upon impact it will, through piston 14, pressurize the fluid within chamber 13.

The pressurization of a chamber 13 by means of the inward movement of a projection 12 will apply fluid pressure to each of the hydraulically actuated brakes for the four wheels 6 by means of the fluid distribution system as follows. The fluid pressure within chamber 13 is transmitted by hydraulic line 15 to an expansible subchamber 16. By means of a balancing piston 17, pressure within subchamber 16 is transmitted to subchamber 18, which is connected by lines 19 to each of the wheel brake mechanisms. While a hydraulic system is preferred, it is also contemplated that the present system may work with air actuated brakes, or a combination of the two.

It is thus seen that an impact delivered to any one or a combination of the projections 12 will pressurize each of the wheel braking mechanisms to expand the brake shoes 8 into engagement with their associated brake drum 7. Thus, the brakes will be engaged before the impact object strikes the bumper, particularly with head-on collisions.

The brakes may automatically be engaged when only the bumper is struck, such as with an impact object acting at an angle upon a side portion of one of the bumpers. Upon striking only the bumper, the impact object will drive the bumper longitudinally and/or transversely with respect to the frame 1 for a substantial distance within the elastic range provided by the resilient mounting 11. If this is the extent of the impact, the bumper 11 will rebound due to the resilient mounting 11 to its former position, without any permanent deformation or damage upon removal of the impact force. If the impact is of sufficient magnitude to drive the bumper longitudinally further than this elastic range, during which elastic range, the projections 12 do not move longitudinally, the bumper will strike one or more abutment members 20, each of which is carried by a projection 12 to drive the projection 12 longitudinally inwardly to actuate the brakes in the manner already described. That is, there is a lost motion connection between each of the projections 12 and its associated bumper so that the bumper may move inwardly relative to the projection 12 for only a limited distance before it picks up and drives the projection 12 therewith. While an elastic range has been mentioned for this lost motion takeup, it is contemplated that the resilient mounting 11 may provide further elastic movement between the bumper and frame 1 even after the bumper engages the abutment 20 and it drives the thus engaged projection 12 inwardly for a substantial distance, so that with subsequent removal of the impact force, the bumper may resume its initial position without permanent deformation or damage.

Figure 4:
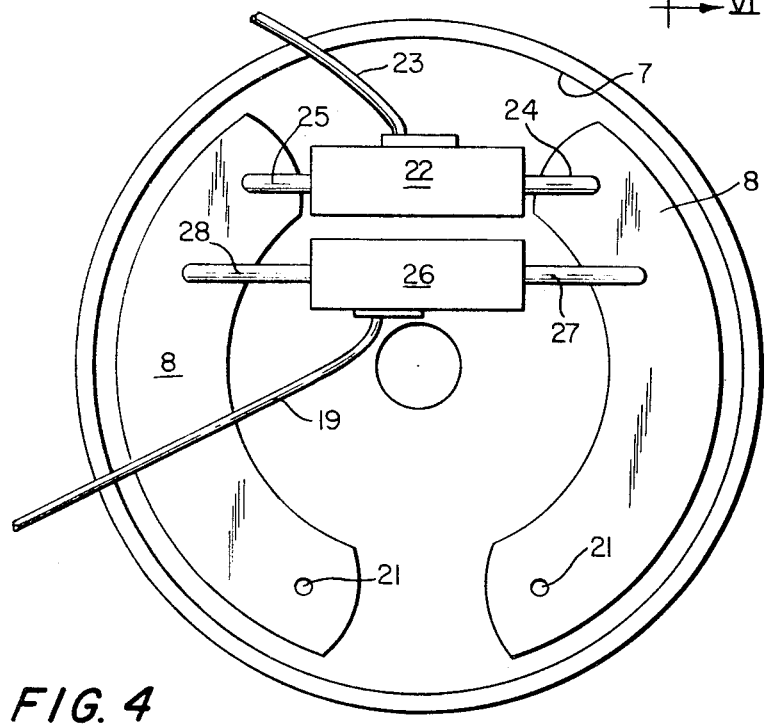
FIG. 4 is a simplified view of a typical wheel brake.

As shown in FIG. 4, each of the wheel brake mechanisms most preferably includes the brake drum 7 connected to the wheel rim, now shown, to frictionally cooperate with the brake shoes 8 in a well known manner when the brake shoes 8 are moved outwardly about their pivot points 21 into engagement with the drum 7 upon either automatic impact actuation of the brakes or selective vehicle operator actuation of the brakes. In a conventional manner, the brakes may be actuated by an operator pressing upon a foot pedal to pressurize fluid within a master cylinder, which mechanism is not shown in the drawing. The master cylinder will in turn pressurize the conventional wheel cylinder 22 through line 23 so that the oppositely arranged plungers 24, 25 will move outwardly in opposite directions from the wheel cylinder 22 to expand the brake shoes into engagement with the brake drum 7. The automatic impact braking system employs an additional wheel cylinder 26, which may be identical in construction to the wheel cylinder 22. The wheel cylinder 26 is provided with oppositely extending plungers 27, 28 which function in a manner identical to the function of the plungers 24, 25 as explained above when the wheel cylinder 26 is pressurized by fluid pressure passing through hydraulic line 19 connected as mentioned previously to the subchamber 18 of FIG. 1.

The detailed structure of the balancing piston 17 and subchambers 16, 18 is shown in FIG. 5. The subchambers 16 and 18 are formed by a central cylindrical member 29 having opposite end flanges 30 for bolting to correspondingly shaped flanges 31 of identical end caps 32, with the interposition of annular sealing gaskets 33. The end caps 32 have cylindrical inner surfaces coextensive with the inner cylindrical surface of the member 29 to form therewith a single cylinder, in which freely moves the piston 17. The piston 17 has at its opposite ends guiding and sealing gaskets, which are preferably O-rings 34. Four peripherally equally spaced line couplings, of conventional construction, 35 are secured to the left hand end cap 32 for receiving the hydraulic lines 19 leading to the wheel cylinders as shown in FIGS. 1 and 4. These couplings may be of any type and since they are conventional in nature will not be described in detail. In a similar manner, the right hand end cap 32 has four equally peripherally spaced couplings 36 for connecting the lines 15 to the chamber 16. Thus, when the chamber 16 is pressurized, the piston 17 will move to the left to correspondingly pressurize the chamber 18. The entire assembly is rigidly mounted to the vehicle frame by means of a U-shaped bracket 37 that is secured to the flanges 31, 30 by some of their connecting bolts 38. FIG. 4 shows the details of construction for the projections 12 and their associated chambers 13. While there are four of these combinations as shown in FIG. 1, only one will be described in detail, since each is identical.

As shown in FIG. 7, the plunger 12 includes a moulded portion 39 having embedded therein the outer end of a relatively stiff coil spring 40, which coil spring 40 has its other inner end secured to the piston rod 41 rigidly attached to the previously mentioned piston 14 for providing a driving connection. As shown, the outer terminal end 42 of the molded portion 39 extends beyond the bumper 9, with the molded portion passing through a slightly larger hole 43 in the bumper 9. The above mentioned lost motion connection between the bumper 9 and the projection 12 is formed by an annular plate 44 that is embedded within the molded portion 39 so that after the bumper 9 has moved inwardly the distance between the bumper 9 and the annular abutment 44, the bumper 9 will thereafter drive the abutment 44 and projection 12 rearwardly as previously indicated. The annular abutment 44 is provided with peripherally arranged holes 44 to allow the molding composition to pass therethrough, which molding composition may be rubber or a synthetic resin. The central portion of the annular abutment is deformed to form a central hole 46 through which passes the longitudinally extending end of the coil spring 40. This end 47 is threaded for the reception of a nut 48 to more rigidly secure the molded portion 39, abutment 44 and coil spring 40 together.

The projection 12 further includes an outer coil spring 49 that engages at one end with the annular abutment 44 and at its opposite end with an in-turned annular flange 50 of a cup-shaped member 51 having an out-turned flange 52 at its opposite end secured by welding or bolts to the frame 1. The central portion of the cup-shaped member 51 has an internal diameter slightly larger than the external diameter of the spring 49 and the annular abutment 44 so as to receive these two elements therein in a guiding manner upon inward movement of the projection 12 with respect to the frame 1. The flange 50 of the cup-shaped member 51 is secured by welding or bolts to an out-turned flange 53 of a spring guide member 54, which has an internal cylindrical surface of slightly larger diameter than the external diameter of the spring 40 and molded portion 39 for guidingly receiving therein these two elements upon inward movement of the projection 12.

The expansible chamber 13 is formed by a cup member 55 having an out-turned flange 56 secured by welding, bolts or the like to a correspondingly shaped out-turned flange 57 of the spring guide member 54, with the inter-position of an annular sealing gasket 58. The spring guide member 54 has an in-turned annular flange 59 guidingly receiving therethrough the piston rod 41, to form together with the cup member 55 the expansible chamber 13. The piston 14 is normally received within the chamber 13 in the position indicated in FIG. 7, with suitable annular gasket or sealing ring means between piston 14 and the cylindrical inner surface of the cup member 55. With inward movement of the projection 12, the piston 14 will be driven downwardly with respect to FIG. 7 by the driving connection afforded by the spring 40 and piston rod 41 so as to pressurize the fluid on the lower side of piston 14. This pressurized fluid, as mentioned previously, will communicate through hydraulic line 15 with the subchamber 16 of FIG. 1 for pressurizing the vehicle brake system. The hydraulic line 15 is connected to the cup member 55 by means of a suitable conventional hydraulic line coupling 60, which will not be described in detail and may be identical to the previously mentioned couplings 35 and 36.

OPERATION

Particularly with a head-on collision, the engagement of an impact object with one or more of the projections 12, with relative movement being in the longitudinal direction, the projection 12 will be driven rearwardly to engage the wheel brakes a substantial time and distance before the impact object strikes the corresponding vehicle bumper 9, 10. Further, the relatively low inertia of the projections 12 will provide an immediate response so that the vehicle will be braked before there is any substantial impact. Further, after the impact object drives the projections 12 inwardly and engages the bumper, there will be a further takeup or spreading out of the shock by means of the resilient mounting 11 between the bumper and stationary frame 1. When the projection 12 is moved inwardly by impact as mentioned above, it will correspondingly drive the piston 14 inwardly within the expansible chamber 13 to pressurize fluid within one or more of the hydraulic lines 17. This will in turn pressurize the brake fluid within subchamber 16 and drive the balancing piston 17 toward subchamber 18 to correspondingly pressurize the fluid within subchamber 18 having communication through hydraulic lines 19 with the individual additional wheel cylinders 26, to pressurize the same. With pressurization of the wheel cylinders 26, the plungers 27, 28 for each of the wheels will move outwardly to radially expand the brake shoes 8 into engagement with the brake drums 7 carried by the wheel rims to correspondingly brake the rotation of the wheels relative to the vehicle frame 1. Thus it is seen that inward movement of any one or more of the projections 12, with respect to the frame 1, will prssurize all of the individual wheel brake mechanisms. Of course, any blow to the projections 12 having a component of force in the longitudinal direction will drive the projections 12 inwardly for actuating the brake system. Further, the molded nature of the molded portion 39 of the projection 12 will provide some shock absorbing feature along with the coil spring connection between the molded portion 39 and the piston 14.

Any impact blow to the bumper 9 or 10 not involving directly engagement between the impact object and associated projection 12 will partially or totally be absorbed by the resilient mounting 11 between the bumper and frame 1, so that the bumper will elastically deform, within limits relative to the frame 1 without permanent deformation or damage so that it may spring back into its original position upon removal of the impact force. If movement of the bumper relative to the frame exceeds a predetermined amount, the lost motion connection between the associated projection 12 and bumper will be taken up so that further movement of the bumper relative to the frame will drive the associated projection 12 inwardly. That is, after takeup of the lost motion, the bumper 9 will engage the abutment 20 to drive the projection 12 inwardly along with the piston 12 to pressurize the fluid brake system as mentioned above. Thus, the brakes will not be automatically engaged with relatively minor impacts with the bumper alone that may be caused by parking maneuvers that will not permanently deform or damage the bumper or its resilient mounting.

The present invention has provided a bumper that is resiliently mounted to absorb relatively minor direct impacts without actuating the brake system or creating permanent deformation or damage, while at the same time providing an automatic brake engaging system that will function upon further movement of the bumper relative to the frame or upon direct engagement between an impact object and a projection extending beyond the bumper. The projections have an inertia far smaller than the inertia of the relatively heavy bumpers employed with automobiles so that the response time for the automatic braking system is held at a minimum. Therefore, the vehicle braking system starts to absorb the impact energy for a substantial period of time before the impact object strikes the bumper with a head-on collision, and the impact energy is further absorbed thereafter by the resilient mounting of the bumper to the frame. Thus the impact shock is spread out over a considerable period of time for the vehicle frame when compared to a corresponding impact shock that would be directly transferred from a rigidly mounted bumper to the frame of a conventional vehicle.

While a preferred embodiment has been shown in the drawing and described in detail for purposes of illustration and is of considerable value with respect to its details, further changes, variations and embodiments are contemplated according to the broader aspects of the present invention, all of which according to the spirit and scope of the present invention as defined by the following claims.

What is claimed is:

1. A motor vehicle impact braking system, comprising: a motor vehicle frame having a longitudinal axis; a plurality of wheels rotatably mounted on said frame about axes generally perpendicular to said longitudinal axis to support the vehicle frame; a brake for at least one of said wheels; first expansible chamber means being expandible under fluid pressure to actuate said brake for braking the one vehicle wheel with respect to said frame; a bumper mounted on said vehicle frame at one longitudinal end thereof; a longitudinally extending impact member mounted for generally longitudinal movement with respect to said frame and bumper, and extending longitudinally beyond said bumper away from said frame to a terminal free end; second expansible chamber means drivingly connected between said frame and said impact member to pressurize fluid contained therein upon impact of said impact member terminal free end with an object having a relative longitudinal speed component with respect to said vehicle frame; fluid communication means interconnecting said first and second expansible chamber means so that contraction of said second expansible chamber means will expand said first expandible chamber means to actuate said wheel brake automatically in response to an impact having a longitudinal component of force applied to said impact member; said bumper being mounted to said frame by means elastically deforming to permit substantial longitudinal predetermined elastic movement of said bumper with respect to said frame for absorbing, without permanent damage, fairly substantial impacts directly on said bumper; and means providing a longitudinal lost motion connection between said impact member and bumper to permit said elastic movement of said bumper without moving said impact member, and provide a driving connection between said bumper and impact member for longitudinal relative movement greater than said predetermined elastic movement to automatically actuate said wheel brake through said expansible chamber means without said impact member directly engaging the impact object.

2. A motor vehicle impact braking system, comprising: a motor vehicle frame having a longitudinal axis; a plurality of wheels rotatably mounted on said frame about axes generally perpendicular to said longitudinal axis to support the vehicle frame; a brake for at least one of said wheels; first expansible chamber means being expandible under fluid pressure to actuate said brake for braking the one vehicle wheel with respect to said frame; a bumper mounted on said vehicle frame at one longitudinal end thereof; a longitudinally extending impact member mounted for generally longitudinal movement with respect to said frame and bumper, and extending longitudinally beyond said bumper away from said frame to a terminal free end; second expansible chamber means drivingly connected between said frame and said impact member to pressurize fluid contained therein upon impact of said impact member terminal free end with an object having a relative longitudinal speed component with respect to said vehicle frame; fluid communication means interconnecting said first and second expansible chamber means so that contraction of said second expansible chamber means will expand said first expandible chamber means to actuate said wheel brake automatically in response to an impact having a longitudinal component of force applied to said impact member; said impact member including a coil compression spring having an axis parallel with said frame longitudinal axis; a relatively stiff molded portion encompassing the coils at one end of said compression spring and extending beyond to said terminal free end; a piston rod secured to the other end of said coil compression spring with a plurality of free spring coils between said rod and molded portion; and said second expansible chamber means including a cylinder and piston drivingly connected between said piston rod and frame having relative reciprocating movement in the longitudinal direction.

3. The system of claim 2, including a guide cylinder longitudinally aligned with said cylinder of said second expansible chamber means and guidingly receiving therein the free coils of said compression spring; and said molded portion of said impact member being of an external diameter conforming to and smaller than the internal diameter of said spring guide chamber for reception therein.

4. The system of claim 3, wherein said impact member further includes a second guide cylinder larger in internal diameter than the internal diameter of said first guide cylinder, and being longitudinally aligned and adjacent to said first guide cylinder; a second coil spring substantially larger than said first coil compression spring and being guidingly received within said second guide cylinder; means providing a rigid abutment for the frame end of said second coil spring stationarily mounted with respect to said vehicle frame; an annular abutment member rigid with and surrounding an intermediate portion of the molded portion of said impact member forming an outer abutment for the outer end of said second coil spring; said annular abutment member being of a diameter corresponding to and smaller than said second guide cylinder for guiding reception therein; the outer portion of said molded portion of said projection extending forwardly from said annular abutment member through said bumper to its free terminal end substantially beyond said bumper; and said annular abutment member being spaced longitudinally inwardly of the adjacent surface of said bumper to provide a lost motion connection therebetween, and being of a size such that upon substantial inward movement of said bumper with respect to said frame, it will engage said bumper to drive said molded portion, first spring and second spring inwardly to correspondingly drive said piston inwardly for contracting said second expansible chamber.

5. A motor vehicle impact braking system, comprising: a motor vehicle frame having a longitudinal axis; a plurality of wheels rotatably mounted on said frame about axes generally perpendicular to said longitudinal axis to support the vehicle frame; a brake for at least one of said wheels; first expansible chamber means being expandible under fluid pressure to actuate said brake for braking the one vehicle wheel with respect to said frame; a bumper mounted on said vehicle frame at one longitudinal end thereof; a longitudinally extending impact member mounted for generally longitudinal movement with respect to said frame and bumper, and extending longitudinally beyond said bumper away from said frame to a terminal free end; second expansible chamber means drivingly connected between said frame and said impact member to pressurize fluid contained therein upon impact of said impact member terminal free end with an object having a relative longitudinal speed component with respect to said vehicle frame; fluid communication means interconnecting said first and second expansible chamber means so that contraction of said second expansible chamber means will expand said first expandible chamber means to actuate said wheel brake automatically in response to an impact having a longitudinal component of force applied to said impact member; a plurality of brake and first expansible chamber means respectively associated with a plurality of the vehicle wheels; a corresponding plurality of said impact member and second chamber means; a balancing fluid chamber being subdivided by a sealing piston into a first expansible subchamber and a second expansible subchamber, with movement of said piston in one direction contracting said first expansible subchamber and expanding said second expansible subchamber, and movement of said piston in the opposite direction contracting said second expansible subchamber and expanding said first expansible subchamber; and all of said second expansible chambers being in direct fluid communication with said first expansible subchamber, and all of said first expansible chambers being in direct fluid communication with said second expansible subchamber.

6. The system of claim 5, wherein there are two impact members equidistant from the frame longitudinal axis and extending longitudinally through said bumper.

7. The system of claim 5, including a second vehicle bumper mounted to said frame at the opposite longitudinal end from said first mentioned bumper; an additional impact member and additional second expansible chamber means associated with said second vehicle bumper substantially identical with said impact member and second chamber means associated with said first mentioned vehicle bumper; and said vehicle having at least four wheels mounted for rotation about respective axes perpendicular to said longitudinal frame axis and each being provided with a brake having a first expansible chamber actuated by said fluid communication means and any one of said second expansible chambers.

8. The system of claim 5, wherein said balancing fluid chamber includes a first cylindrical member having opposed outer annular flanges; identical end cap members having internal cylindrical diameters identical with said first cylindrical member internal diameter, and outer annular flanges at their open ends sealingly secured to respective annular flanges of said first cylindrical member; and said cap members further having radially extending fluid coupling fittings for receiving the appropriate ends of fluid lines connected to respective ones of said first and second expansible chambers to form said fluid communication means.

* * * * *